United States Patent [19]

Parks et al.

[11] 4,377,336
[45] Mar. 22, 1983

[54] HEATED PRESSURE ROLLS

[75] Inventors: Dale B. Parks, Rochester; Ronald A. Fannon, Chase Mills; Ronald T. Kosmider, East Rochester, all of N.Y.

[73] Assignee: Bunnington Corporation, Rochester, N.Y.

[21] Appl. No.: 271,163

[22] Filed: Jun. 8, 1981

[51] Int. Cl.³ .............................................. G03G 15/20
[52] U.S. Cl. ................... 355/3 FU; 29/447; 219/216; 219/388; 432/60
[58] Field of Search ............ 355/3 FU; 219/216, 244, 219/388; 118/641, 642; 432/60; 29/132, 125, 148.4 D, 447, 129.5, 130, DIG. 35

[56] References Cited

U.S. PATENT DOCUMENTS

| | | | |
|---|---|---|---|
| 1,938,995 | 12/1933 | Beynon | 29/129.5 |
| 3,365,774 | 1/1968 | Kusters | 29/129.5 X |
| 3,731,367 | 5/1973 | Laussermair et al. | 29/DIG. 35 |
| 3,751,216 | 8/1973 | Gregory | 432/60 X |
| 3,874,894 | 4/1975 | Pedersen | 355/3 FU |
| 3,988,061 | 10/1976 | Root | 355/3 FU |
| 4,019,024 | 4/1977 | Namiki | 432/60 X |
| 4,025,751 | 5/1977 | Wright | 29/447 |
| 4,065,586 | 12/1977 | Eddy et al. | 430/99 |
| 4,078,286 | 5/1978 | Takiguichi | 29/132 |
| 4,109,135 | 8/1978 | Minden et al. | 219/216 |
| 4,179,601 | 12/1979 | Tarumi et al. | 219/388 X |
| 4,196,256 | 4/1980 | Eddy et al. | 430/99 X |
| 4,266,115 | 5/1981 | Dannatt | 219/216 |
| 4,329,566 | 5/1982 | Hooper | 219/216 |
| 4,339,194 | 7/1982 | Scribner | 355/3 FU |

*Primary Examiner*—R. L. Moses
*Attorney, Agent, or Firm*—Martin LuKacher

[57] ABSTRACT

Pressure rolls useful in printing, embossing, coating, calendering, conveying, and fixing images to substrates. The pressure rolls comprise a cylindrical core provided with an array of axial slots, a heating element disposed in the slots, and a shell around the core. The pressure rolls may be employed in apparatus for fixing a toner material image pattern on a substrate such as a paper sheet. The pressure contact between the sheet and the pressure rolls is established by a hydrostatic assembly which may be pre-set.

11 Claims, 7 Drawing Figures

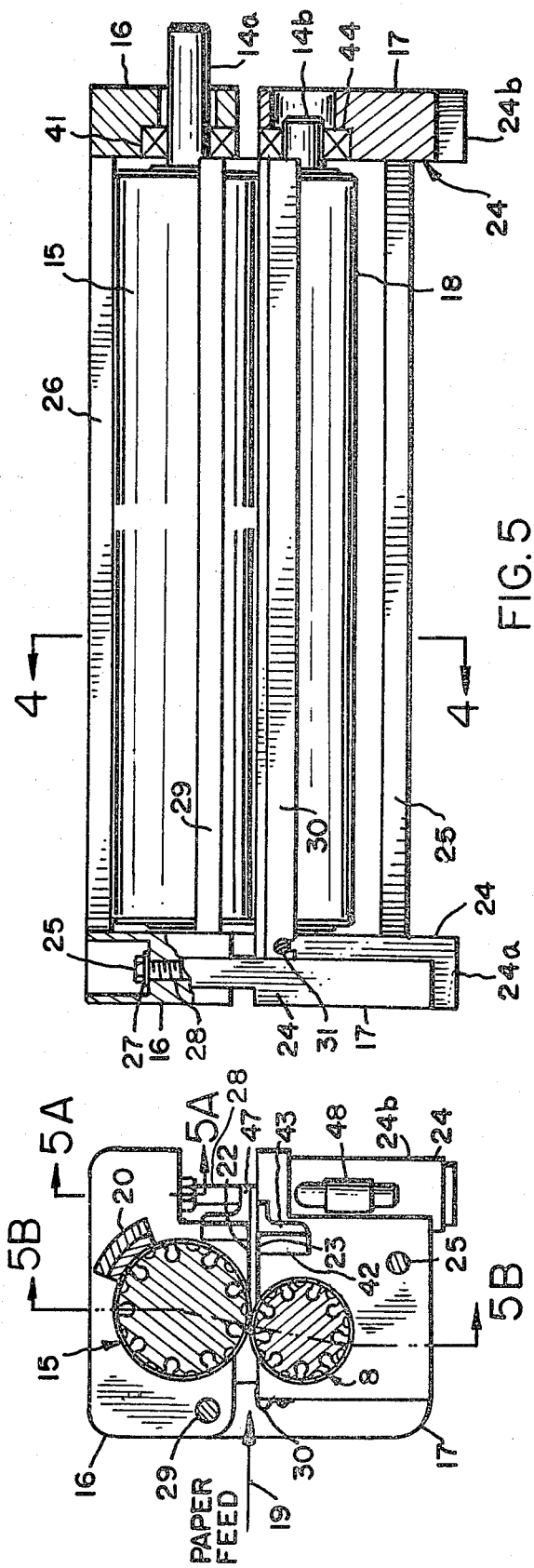

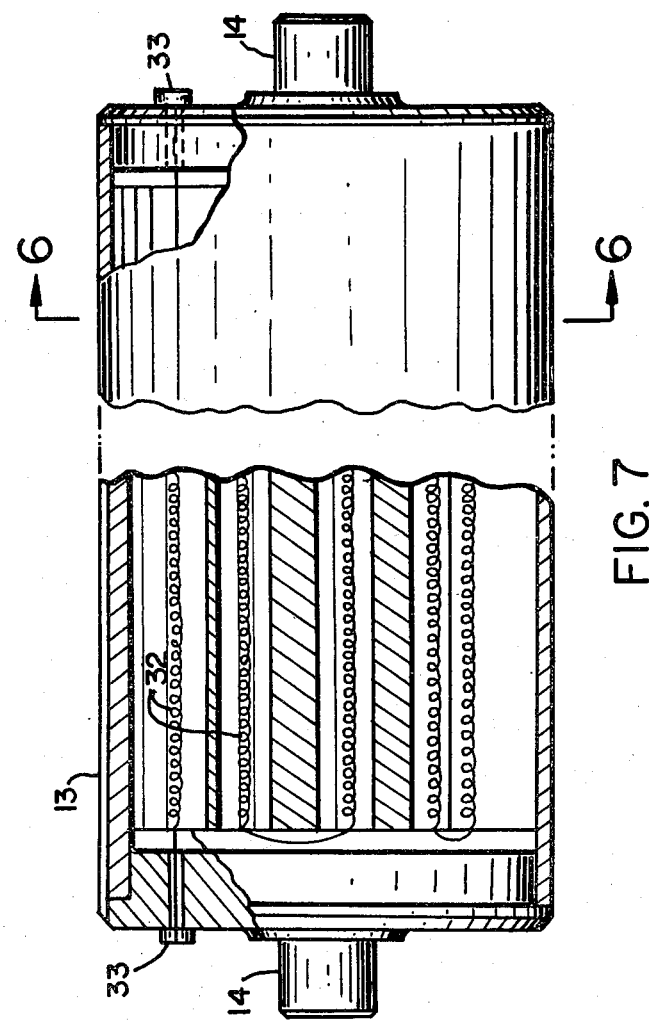
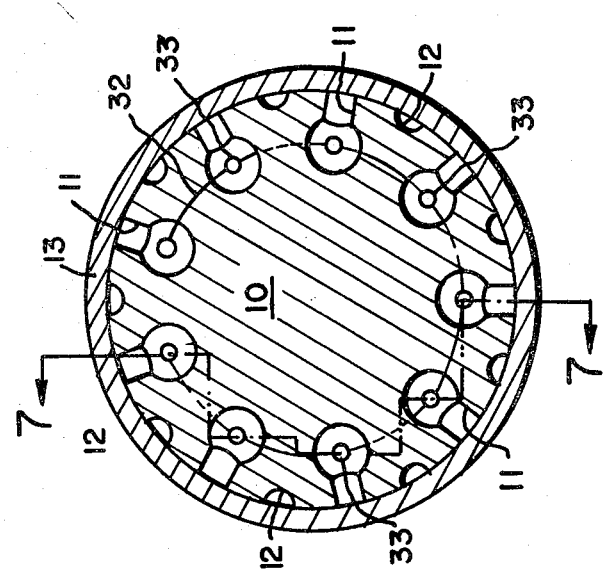

HEATED PRESSURE ROLLS

DESCRIPTION

This invention relates to cryogenically assembled rolls and, more particularly, to the provision of a method for preparing pressure rolls, the articles of manufacture, and their use.

Pressure rolls or rollers have found many applications, for example, for printing, embossing, coating, calendering or conveying sheet material and the like. Pressure rollers have found particular utility in electrostatic copying and duplicating devices as transfer elements and fixing units.

Typically, electrostatic copying involves providing a photoconductive surface, establishing a uniform electric charge on the surface, and projecting on the charge surface a light and shadow image of the subject matter to be reproduced thereby discharging portions of the photoconductive surface in accordance with the intensity of radiation reaching the surface. Such creates an electrostatic latent image on the photoconductive surface which is then developed or made visible by contacting it with finely-divided toner particles which are attracted to and loosely held by electrostatic forces to those portions of the photoconductive surface which have not been discharged by the radiation. The image so developed is then made permanent by a fusing or fixing operation.

Fusing of the image is generally conducted at elevated temperatures involving a coalescence of the toner particles to each other and adhesion of the resultant mass to a permanent substrate such as a paper sheet. With a fixing procedure, coalescence is generally accomplished at ambient temperatures by the simple use of pressure, or if desired, a solvent system may be employed.

Various electrostatic copying arrangements are employed. For example, in some the photoconductive surface is an integral portion of the copy. In others, the photoconductive surface is formed on an intermediary member such as a platen, drum, or cylinder, from which a developed toner image is transferred to a sheet for subsequent fusing or fixing to provide the final copy. The cryogenically assembled rolls of the present invention may be employed with either of these arrangements because they are applicable to that portion of the electrostatic copying step which is concerned with providing permanency to the toner image developed on or transferred to the copy sheet.

In the past, most commercial embodiments of electrostatic copying machines employed elevated temperature fusing devices because they were most consistent in producing high quality copies. However, such devices were found to have the disadvantage of high initial and maintenance costs and the constant danger of fire hazard. Therefore, it was quickly found desirable to provide a heatless fushing station located downstream of the developing station in the form of pressure means as disclosed in German Patent Publication (Offenlegungsschrift) No. 2809750 and U.S. Pat. No. 3,655,282. Because there is no heat requirement, the machine consumes less energy and substantially eliminates any fire hazard. Such a device for fixing images of an original document on sheets of copy material includes two rollers in pressure engagement as disclosed in U.S. Pat. No. 3,846,151. The fixing device may include an emulsion of a release agent and an anti-static agent applied to the surface of one of the two rollers in pressure engagement. Alternately, the fixing device may include a release agent applied to the surface of one of the two rollers and an anti-static agent applied to the surface of the other of the two rollers. However, the use of a release agent has not eliminated all of the objections to the use of such a fixing device. The most serious objection is the occurrence of jams in the fixing device caused by the tendency of copy sheets to wrap around the surface of one of the two rollers in pressure engagement. The rollers therein comprise one roller formed of steel, and the other roller preferably comprises a steel core having an outer nylon housing.

A further method of fixing toner images to a surface without the use of heat by employing pressure is taught in U.S. Pat. No. 3,854,975 wherein pressure is applied by two somewhat compliant rolls, or one somewhat compliant roll and one relatively rigid roll. It is indicated that the use of such an arrangement makes it possible to apply a substantially uniform pressure to the toned areas to obtain a uniform fixing action.

Still another apparatus for ambient temperature pressure fixing of toners is indicated in U.S. Pat. No. 3,874,894 wherein the working surface of at least one of a pair of pressure rolls is formed of nylon-6 and undergoes recovery from deformation while remaining in service.

However, all such prior fixing devices suffer from various deficiencies. Experience has shown that prior ambient pressure fixing devices have proven to be very unreliable, possibly due to poor contact between the rollers because of nonuniformity of the substrate thickness, variations in the toner pile deposit, or the like, even though use is made of extremely high pressure loadings in an effort to obtain an image adequately adhered in all of its portions. In addition, under high loadings the character of the paper substrate itself may be materially altered, for to apply enough pressure to the low points or areas in the paper to properly fix the toner, it is necessary to apply excessive pressures to the high points. This, in turn, can materially alter the substrate and bring about unwanted surface characteristics in the unprinted areas, i.e., make certain areas shiny or glossy rather than permitting them to remain dull.

Further, even when such fixing devices employ rolls having thermoplastic working surfaces, these will have to be taken out of service to be repaired. Removing a roll from service, replacing it with a new or repaired roll and repairing the roll is an expensive and time-consuming proposition. Likewise, solid steel rolls are expensive, especially when chrome-plated and are very heavy.

It is therefore apparent that there is a need for an improved pressure-fixing device and pressure rolls for electrostatic copying apparatus. Although the novel pressure rolls have thus far been related primarily to electrostatic copying apparatus, as earlier indicated, they are not limited to such application.

Therefore, it is an object of this invention to provide a pressure-fixing device and process which overcome the above-noted disadvantages.

It is a further object of this invention to provide a novel method of fabricating pressure rolls.

It is still another object of this invention to provide an improved process for pressure-fixing toner material to a substrate.

It is still a further object of this invention to provide a fixing method and pressure roll which supplies a substantially uniform pressure to applied areas without adversely affecting portions of the substrate.

It is yet another object of this invention to provide pressure rolls which are less expensive to manufacture and are of lighter weight than conventional rolls.

It is yet another object of this invention to provide improved, heated pressure rolls.

A still further object of this invention is to provide an improved heated pressure roll system wherein pressure contact is provided by hydrostatic means.

Briefly, the above and other objects of the present invention are achieved by a device for fixing images of original documents on copy material having two rollers in pressure engagement, each roller comprising a core component and a shell component.

In accordance with one aspect of the present invention, there is provided a process of preparing pressure rolls comprising cryogenically cooling a core component to about the temperature of liquid nitrogen, i.e., about −240° F., removing the core component from the cryogenic cooling environment, inserting a sleeve component over the core component, and allowing the composite core and sleeve components to warm to ambient temperature whereby during warming the cooled core component thermally expands and secures the sleeve component to the core component.

In accordance with another aspect of the invention the core is provided with an array of axial slots in its periphery. A heating element is disposed in the slots; preferably in the bottom of the slots below the sleeve.

For a better understanding of the invention, as well as other objects and further features thereof, reference is had to the following detailed description of the invention with the accompanying drawings, wherein:

FIG. 4 is a sectional end view taken along the line 4—4 in FIG. 5 of a pressure-fixing device having an assembly of pressure rolls of the type shown in FIGS. 1-3;

FIG. 5 is a frontal view of the pressure-fixing device shown in FIG. 4, taken in the paper feed-in direction which is from the left in FIG. 4, and partially in section; the section through the side plate at the left being taken along line 5A—5A in FIG. 4, and the section through the side plate at the right being taken along the line 5B—5B;

FIG. 6 is a partially sectional view of a heated pressure roll structure using a pressure roll of the type shown in FIGS. 1-3 and embodying the invention; and FIG. 7 is a front view, partially in section, of the heated pressure roll structure shown in FIG. 6, the fragmentary section on the left being taken along the line 7—7 of FIG. 6.

Figure 1:
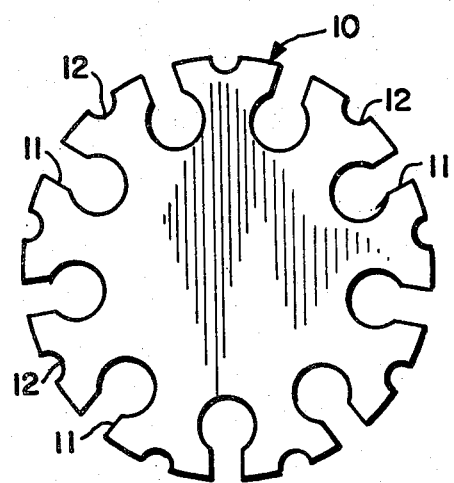
FIG. 1 is an end view of the core component of the pressure rolls of this invention.

For a general understanding of the pressure rolls of this invention, reference is made to FIG. 1 wherein is shown generally pressure roll core component 10 having a general circular configuration. Core component 10 is provided with an array of axial slots 11 therein comprising circular sectors in cross sectioning form at the bottom thereof. Axial slots 11 are alternately bordered by an array of adjacent axial slots 12 or cavities of semi-circular cross sections having a depth substantially less than that of axial slots 11.

Figure 2:
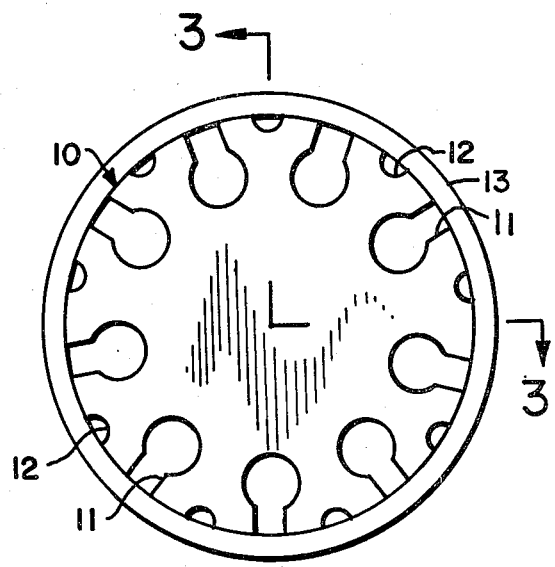
FIG. 2 is an end view of the pressure roll assembly depicting the core and shell components in combination.

FIG. 2 is similar to FIG. 1 but in addition shows pressure roll shell or sleeve component 13 installed in place over pressure roll core component 10.

Figure 3:
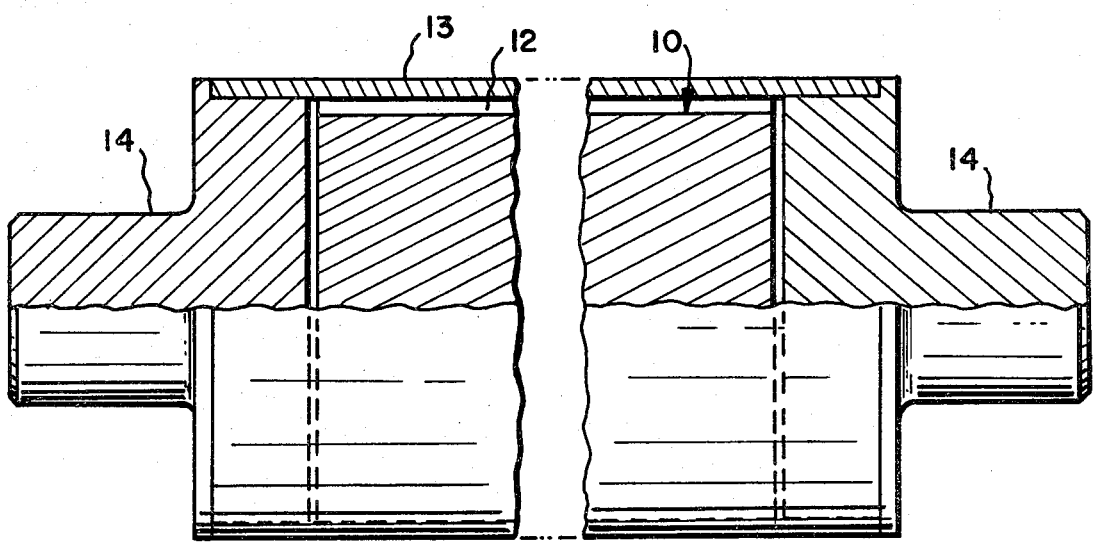
FIG. 3 is a frontal view, partially in section along line 3—3 in FIG. 2, depicting the roll assembly installed in journals.

FIG. 3 shows the pressure roll assembled with end caps or journals 14 therefor.

The core is made from a material having a high thermal expansion/contraction coefficient. Aluminum is preferred. The core may be extruded with the slots 11 and 12 in place and cut to length. The sleeve 13 is preferably a stiff material which has a non-porous and non-adherent surface. High chrome stainless steel is preferred, e.g. type 300 series and preferably type 304. The sleeves are commercially available in tubes having precise tolerances in their outside diameters. The inside diameter is not critical because of the cryogenic assembly of the sleeve and core. The sleeve is cut to length. Then the core is cooled to low temperature. This is conveniently accomplished by immersing the core in a both of liquid nitrogen. The core may be submerged in the bath for a few minutes or more. Several cores may be cooled at the same time. The sleeves may be at room temperature or heated so that they expand somewhat. The temperature to which the tubes are heated may be 120°-200° F. Heating is not necessary, but is preferred. The tubes and core now differ in diameter by at least a few hundreths of an inch and can be assembled, either manually with tongs, but preferrably with the aid of a jig. The end caps 14 may be inserted after assembly and after the core and sleeve have returned to room temperature. The end caps may have a friction (tapered) fit or set screws not shown may be used, since the paper does not contact the sleeves in the area of the end caps. Preferrably one end cap is attached to the tube, the core inserted and, after the assembly returns to room temperature, the other end cap is inserted and attached. Spaces or clearance is provided between the ends of the core 10 and the end caps as shown in FIG. 3.

FIG. 4 and FIG. 5 shows an assembly of the pressure rolls of this invention in a frame which provides a pressure-fixing device for toner on a sheet of support material. The pressure-fixing device comprises a top roll 15 and a bottom roll 18. A top frame section 16 and bottom frame section 17 support the top roll 15, and bottom roll 18, respectively. A shaft 29 pivotly mounts the top frame on the bottom frame. Paper feed path 19 is indicated by the arrow passing between top roll 15 and bottom roll 18. The top roll 15 is driven, by a gear or sprocket (not shown) connected to an extension 14a of its end cap or journal. Also shown in FIG. 4 is cleaning device 20 to remove any toner adhering to top roll 15 following the pressure-fixing operation.

As shown in FIG. 4, top roll 15 and bottom roll 18 are mounted slightly off-center so that as the sheet of paper (the toner support material) passes therebetween, the sheet is guided upward to help in preventing it adherence to bottom roll 18. Bottom roll 18, which is an idler roll, is positioned slightly ahead of top roll 15 and slightly above the horizontal plane of paper feed path 19. The pressure-fixing device is also equipped with two pick-off means, 22 and 23, one being located adjacent to top roll 15 and the other located adjacent to bottom roll 18 to control the path of the sheet of support material and act as scrapers. The pick-off means are typically very thin, i.e., on the order of a 0.004 inch thick, and generally comprise stainless steel strips which extend the axial length of the rolls 15 and 18. In addition, the surface of top roll 15 may be provided, via the cleaning device 20, with a supply of a releasing and/or anti-static agent, not shown, to prevent adherence of toner material to its surface and/or the development of static charges on the surface of the sheet material. Typically, the releasing and/or anti-static agent is applied as a thin layer of a liquid which is commercially available, such as silicone oils. A curved feed strip 30 attached to the bottom frame 16 guides the paper into the nip between the rolls 15 and 18. The pressure-fixing device further includes a hydrostatic assembly 24 for establishing the contact pressure of the rolls 15 and 18 and increasing or decreasing the pressure to accommodate toners used and other characteristics of the electrostatic copier which is equipped with the pressure fixing device.

As shown in FIGS. 4 and 5, the bottom frame section 17 has two side plates held together by a tie rod 25, a bar 42 and angle 43. The bottom roll journals 14b are rotatably supported in ball bearings 44 in the bottom frame section's side plates. The top frame section 16 also has two side plates held together by the cleaning device, another bar 45 and angle 47. The bars and angles 45 and 47 and 42 and 43 clamp and locate the pick-off strips 22 and 23. The journals 14a are supported in ball bearings 41 in the side plates of the top frame 16. The hydrostatic assembly has two hydraulic cylinders 24a and 24b secured to the side plates of the bottom frame section 17. The pistons of these cylinders hve shafts 28, the ends of which extend through holes in the side plates of the top frame section 16. The ends of these shafts 25 are threaded and attached to the top frame 16 side plates by nuts 27. When pressurized oil is applied to the cylinders 24a and 24b, for example, by way of a "T" coupling 48, the top frame 16 is pulled down to apply the required contact pressure between the rolls 15 and 18.

In operation, the pressure applied to sheets of copy material by the hydraulic cylinders of the hydrostatic assembly 24 is such that upon passage through the nip of top roll 15 and botom roll 18, unfixed toner images are converted to fixed toner images. This may be accomplished at ambient (room) temperature. The rolls may conveniently be heated and the temperature monitored and controlled by a thermostat (not shown) mounted on the frames, for example on the cleaning device 20.

Core component 10 is preferably constructed from aluminum as it is lightweight material compared to steel and provides the pressure rollers of this invention with a weight reduction of about thirty percent compared with conventional rollers. Aluminum also has a high thermal coefficient of expansion and loses or absorbs heat quickly during assembly of the core and shell components. The shell component is preferably made of high chrome stainless steel to provide a smooth surface with non-sticking properties. In addition, the core dimensions are not critical since thermal expansion thereof of a few hundreths of an inch assures a tight fit with the shell component. The shell component however is preferrably ground to exact dimensions.

It is important to note that the peripheral configuration of the core component behaves as a heat sink, thus promoting greater surface contraction during its assembly into the shell component. Further, this configuration will tend to displace surface points of contact pressure from the shell through the core. A still further advantage of the pressure rolls of this invention is their reduction in weight. More specifically, a weight reduction may be obtained relative to the construction materials selected such as steel, brass, copper, aluminum or structural, plasticized foam. In various applications, for example as in the printing industry, the core and shell components may enable the use of a high tensile strength metal such as stainless steel for wear resistance of the shell and an extruded aluminum core, providing significant material cost savings. This invention also improves upon prior pressure roll systems by providing improved pressure rollers which are less expensive to manufacture, and wherein hydraulic means may be employed to pre-set the pressure applied to a paper sheet or other carrier by the rollers. The construction of the rollers also facilitates the introduction of means for applying heat to the rolls where desired such as in combined simultaneous pressure and heat fixing systems for xerographically produced images in a simple and effective manner. Since the contact area of pressure rollers required to fix a toner image on a sheet of paper should not exceed about $2\frac{1}{2}$ mm, the pressure rollers of this invention meet that requirement due to their ability to provide uniform pressures and the system may be fine-tuned due to its hydraulic loading apparatus compared with a spring-loaded system. The pressure rolls of this invention provide more uniform pressure distribution thereby assuring adequate fixing properties while avoiding excessively high pressures that result in calendering a substrate.

Referring now to FIG. 6 and FIG. 7, there is shown the pressure rolls of this invention comprising core component 10 provided with an array of axial slots 11 bordered by an array of adjacent slots 12. Over core component 10 is shell or sleeve component 13 as in FIG. 3. Inserted inside of axial slots 11 is a heating element 32 which may be connected to an electrical power supply to provide heat to the pressure rolls of this invention. Element 32 is threaded in a serpentine manner through axial slots 11 after core component 10 and shell component 13 are assembled, and may be cemented in place by a high temperature cement.

FIG. 7 further depicts the pressure rolls of this invention illustrating lead terminal 33 providing electrical power supply to heating element 32 which may comprise a nichrome wire or similar material. These terminals may be connected to slip rings on the end caps or journals 14 employed for support and rotation of the pressure rolls of this invention.

While the invention has been described with reference to the specific structures disclosed herein, it is not restricted to the details set forth and this disclosure is intended to cover such modifications or variations as may come with the purview of one skilled in the art.

What is claimed is:

1. Pressure roll apparatus comprising a cylindrical core having a general circular configuration and provided with an array of axial slots comprising circular sectors, said axial slots being alternately bordered by an array of cavities having a depth substantially less than that of said axial slots, a heating element in said slots, and a shell around said core.

2. Pressure rolls apparatus as set forth in claim 1 wherein said core is an extrusion.

3. Pressure roll apparatus as set forth in claim 1 wherein said slots have sections which are at least partially circular in cross section.

4. Pressure roll apparatus as set forth in claim 1 wherein said slots have equal center to center distance therebetween along the periphery of said core.

5. Pressure roll apparatus as set forth in claim 1 wherein alternate ones of said slots in a direction around said core have different lengths radially inwardly of said core.

6. Pressure roll apparatus as set forth in claim 1 wherein alternate ones of said axial slots of said core component contain said heating element and are deeper than the slots adjacent thereto.

7. Pressure roll apparatus comprising a cylindrical core of material having a plurality of axial slots in side-by-side relationship, said axial slots being alternately bordered by an array of cavities having a depth substantially less than that of said axial slots, a tubular sleeve over said core having an inside diameter which is less than the outside diameter of said core at ambient temperature and greater than the outside diameter of said core at cryogenic temperatures, and a heating element disposed in said slots of said core.

8. Apparatus for providing a permanent image on a sheet by fixing an image of toner material which is obtained from an electrostatic latent image by depositing toner material upon said sheet to provide such toner material image in conformity with said latent image, said apparatus comprising at least one pressure roll comprising a sleeve component and a core component, said core component having a general circular configuration with an array of axial slots comprising circular sectors, said axial slots being alternately bordered by an array of cavities having a depth substantially less than that of said axial slots, and a heating element disposed in said slots.

9. An apparatus in accordance with claim 8 wherein said sleeve component comprises steel and said core component comprises aluminum.

10. Apparatus for providing a permanent image on a sheet by fixing an image of toner material thereto, said apparatus comprising at least one pressure roll comprising a sleeve component and a core component, said core component having a general circular configuration with an array of axial slots comprising circular sectors, said axial slots being alternately bordered by an array of cavities having a depth substantially less than that of said axial slots, a heating element disposed in said slots, and a hydrostatic assembly for establishing a contact pressure between said pressure roll and said sheet.

11. Apparatus for providing a permanent image on a sheet as set forth in claim 10 wherein said contact pressure is pre-set from said hydrostatic assembly.

* * * * *